(12) United States Patent
Paes et al.

(10) Patent No.: US 12,534,004 B2
(45) Date of Patent: Jan. 27, 2026

(54) SEAT SURFACE TEMPERATURE CONTROL

(71) Applicant: Rivian IP Holdings, LLC, Plymouth, MI (US)

(72) Inventors: Paulo Paes, Irvine, CA (US); Amr Mohamed Zedan, Irvine, CA (US); Dewashish Prashad, Irvine, CA (US); Ajay Panekkad, Laguna Niguel, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 537 days.

(21) Appl. No.: 18/148,643

(22) Filed: Dec. 30, 2022

(65) Prior Publication Data

US 2024/0217407 A1    Jul. 4, 2024

(51) Int. Cl.
*B60N 2/56* (2006.01)
*B60H 1/00* (2006.01)

(52) U.S. Cl.
CPC ....... *B60N 2/5657* (2013.01); *B60H 1/00735* (2013.01)

(58) Field of Classification Search
CPC .... B60N 2/002; B60N 2/0025; B60N 2/0024; B60N 2/5657; B60N 2/5628; B30H 1/00735; B30H 1/00742; B30H 1/0075; B60H 1/00285; B60H 2001/003; B60H 1/00878
See application file for complete search history.

(56) References Cited

U.S. PATENT DOCUMENTS

2021/0170827 A1\* 6/2021 Jeong ................. B60H 1/00885

\* cited by examiner

*Primary Examiner* — Ko-Wei Lin
(74) *Attorney, Agent, or Firm* — Foley & Lardner LLP

(57) ABSTRACT

A system includes one or more processors, coupled with memory, to receive, from a first sensor in a vehicle, temperature information. The one or more processors can identify a parameter of a device that provides airflow for a seat of the vehicle. The one or more processors can determine, via a model based on the temperature information and the parameter of the device, a temperature of a surface of the seat and control a temperature of the airflow provided via the device for the seat based on the temperature of the surface of the seat.

20 Claims, 5 Drawing Sheets

SEAT SURFACE TEMPERATURE CONTROL

SUMMARY

This disclosure is generally directed to estimate the temperature of a component or portion of the vehicle, and control the temperature of the component or portion of the vehicle. For example, this technology can estimate the temperature of the surface of a seat in the cabin of the vehicle, and control the temperature of the surface of the seat in the cabin. Temperature controllers can use a temperature sensor at a heating pad of the seat. However, the heating pad temperature can be significantly different than the actual seat surface temperature. This inaccuracy can lead to inefficient temperature control performance, poor driver thermal comfort, and wasted energy or battery utilization.

Systems and methods of this technical solution can use a model to estimate surface-averaged seat temperature as a function of vehicle signals capturing real dynamics as the seat is occupied or unoccupied at ambient temperatures and solar conditions. The model can use a temperature sensor at heating pads and other vehicle sensors (cabin and evaporator temperature, blower duty cycle feedback, cabin heater power). The model can be validated against measured surface-averaged seat temperature in distinct ambient conditions both in chamber and driving tests. Thus, a temperature controller using the model can maintain thermal comfort faster and more efficiently than directly using the temperature sensor at heating pads, thereby improving the performance of the temperature controller while reducing energy or battery consumption.

At least one aspect is directed to a system. The system can include one or more processors, coupled with memory. The one or more processors can receive, from a first sensor in a vehicle, temperature information. The one or more processors can identify a parameter of an airflow device, such as a blower or a fan, that provides airflow for a seat of the vehicle. The one or more processors can determine, via a model based on the temperature information and the parameter of the device, a temperature of a surface of the seat. The one or more processors can control a temperature of the airflow provided via the airflow device for the seat based on the temperature of the surface of the seat.

At least one aspect is directed to a method. The method can include receiving, by one or more processors coupled with memory, from a first sensor in a vehicle, temperature information. The method can include identifying, by the one or more processors, a parameter of an airflow device that provides airflow for a seat of the vehicle. The method can include determining, by the one or more processors via a model, a temperature of a surface of the seat based on the temperature information and the parameter of the airflow device. The method can include controlling, by the one or more processors, a temperature of the airflow provided via the airflow device for the seat based on the temperature of the surface of the seat.

At least one aspect is directed to an electric vehicle. The vehicle can include one or more processors, coupled with memory, to receive, from a first sensor in a vehicle, temperature information. The one or more processors of the vehicle can identify a parameter of a blower that provides airflow for a seat of the vehicle. The one or more processors of the vehicle can determine, via a model based on the temperature information and the parameter of the blower, a temperature of a surface of the seat. The one or more processors of the vehicle can control a temperature of the airflow provided via the blower for the seat based on the temperature of the surface of the seat.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems to control the temperature of the surface of a seat in a vehicle. The various concepts introduced above and discussed in greater detail below may be implemented in any of numerous ways.

This disclosure is directed to systems and methods of determining the temperature of a surface of a seat and controlling the temperature of the seat responsive to the determination. A vehicle can include one or more sensors for measuring the environment of the vehicle and can include one or more controllers of the vehicle. For example, temperature controllers can use a temperature sensor at a heating pad of the seat. However, the heating pad temperature can be significantly different than the actual seat surface temperature. This inaccuracy can lead to inefficient temperature control performance, poor driver thermal comfort, and wasted energy or battery utilization.

Systems and methods of this technical solution can use a model to estimate surface-averaged seat temperature as a function of vehicle signals capturing real dynamics as the seat is occupied or unoccupied at ambient temperatures and solar conditions. The model can use a temperature sensor at heating pads and other vehicle sensors (cabin and evaporator temperature, blower duty cycle feedback, cabin heater power). The model can be validated against measured surface-averaged seat temperature in distinct ambient conditions both in chamber and driving tests. Thus, a temperature controller using the model can maintain thermal comfort faster and more efficiently than directly using the temperature sensor at heating pads, thereby improving the performance of the temperature controller while reducing energy or battery consumption.

Figure 1:
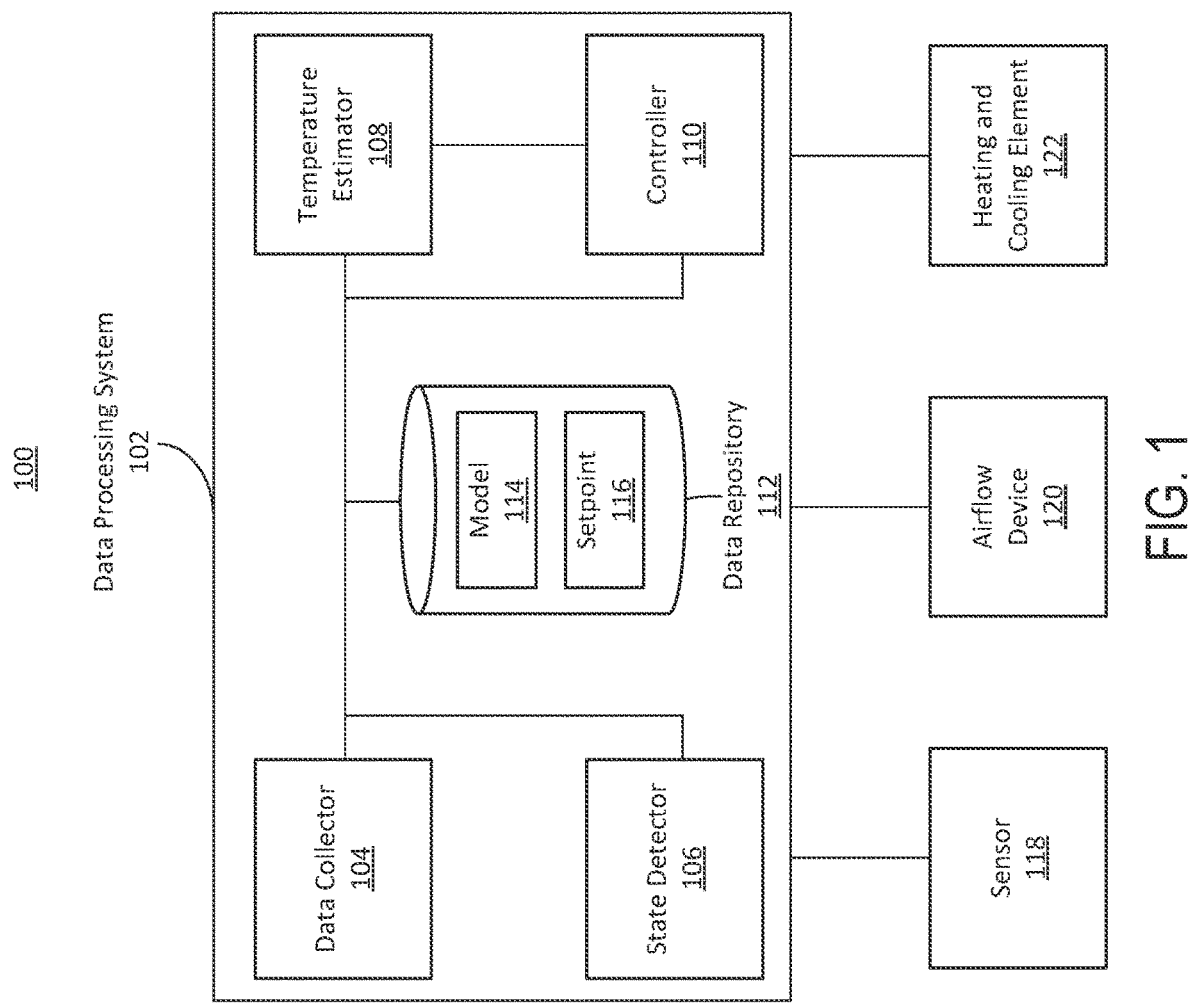
FIG. 1 depicts an example system to control the temperature of a surface of a seat in a vehicle.

FIG. 1 depicts an example system 100 to control the temperature of the surface of a seat of a vehicle. The system 100 can include a data processing system 102, a sensor 118, an airflow device 120, or a heating and cooling element 122. The data processing system 102 can include a data collector 104, a state detector 106, a temperature estimator 108, a controller 110, or a data repository 112. The data collector 104, state detector 106, temperature estimator 108, or controller 110 can each communicate with the data repository 112.

The data repository 112 can be any memory, storage, or cache for storing information or data structures of the system 100. Data repository 112 can contain any information about the system 100 and can allow that data to be accessed by any components of the system 100, such as by communication methods described herein. Data repository 112 can contain at least models 114 and setpoints 116. The information or data structures (e.g., tables, lists, or spreadsheets) contained within data repository 112 can be dynamic and can change periodically (e.g., daily or every millisecond), via an input from a user, via information from a sensor 118, via inputs from subcomponents of the data processing system 102 (e.g., data collector 104 or state detector 106), or via an external update to the system, for example. Information in data repository 112 can be stored in any kind of memory, such as a cloud or hard drive. Data repository 112 can include, for example, random access memory (RAM), dynamic random access memory (DRAM), static random access memory (SRAM), error-correcting code (ECC), read only memory (ROM), programmable read only memory (PROM), or electrically erasable read only memory (EEPROM). Data repository 112 can be accessed at any time and by any component of system 100. For example, data repository 112 can be accessed by the system 100 at least periodically, in response to a change in seat detection by state detector 106, in response to temperature estimator 108 determining an estimated temperature which exceeds or is under a setpoint 116, or in response to new information collected by the data collector 104.

The model 114 can refer to or include a model that can facilitate estimating the temperature of a component or portion of a cabin of the vehicle. The model 114 can include a physics-based model or other type of model with one or more parameters, variables, or coefficients. The setpoint 116 can be a threshold, limit, quantity, target or amount of heat, cooling, or airflow from the airflow device 120 or the heating and cooling element 122. The setpoint 116 can be stored in data repository 112. The setpoint 116 can be determined by a user input, an external computing device, or by a schedule of setpoints. In some embodiments, the setpoint 116 can indicate a desired temperature of a component of the vehicle such as a seat 455 of the vehicle, the ambient air of the vehicle, a cabin of the vehicle, or the steering wheel of the vehicle. Setpoints 116 can be reset, for example, by a second user request, a system request, or periodically.

The data collector 104, state detector 106, temperature estimator 108, or heating controller 110 can each include at least one processing unit or other logic device such as programmable logic array engine, or module configured to communicate with the data repository 112 or database. The data collector 104, state detector 106, temperature estimator 108, or heating controller 110 can be separate components, a single component, or part of the data processing system 102. The system 100 and its components, such as a data processing system 102, can include hardware elements, such as one or more processors, logic devices, or circuits.

The data processing system 102 can interface with, communicate with, or otherwise receive or provide information with one or more of the sensor 118, airflow device 120, or heating and cooling element 122. The data processing system 102 can include at least one logic device such as a computing device having a processor to communicate via a network. The data processing system 102 can include at least one computation resource, server, processor or memory. For example, the data processing system 102 can include a plurality of computation resources or processors.

The sensor 118 can include one or more sensors. The sensor 118 can include any type of sensor designed, constructed or operational to facilitate estimating and controlling the temperature. The sensors 118 can be dispersed internal or external to the vehicle. The sensors 118 can to transmit information regarding the vehicle's environment to the data collector 104. The sensors 118 can include temperature sensors, such as negative temperature coefficient (NTC) thermistors, positive temperature coefficient (PTC) thermistors, temperature transducers, thermocouples, or resistance temperature detectors (RTD). One or more of the sensors can be a temperature sensor as described and can be located at a heating pad of the seat 455, within the cabin of the vehicle to measure an ambient cabin temperature, or at an evaporator of the vehicle. In some cases, a sensor 118 can be located as to measure the surface of the seat 455 temperature, a cabin temperature, an evaporator of the vehicle, or a temperature of airflow output by a heater (e.g., heating and cooling element 122) or an airflow device 120 of the vehicle.

The sensors 118 can include one or more sensors to measure solar radiation at one or more locations within the vehicle. A sensor to measure solar radiation can include a light sensor, ambient light sensor, or a photovoltaic pyranometers. Sensors 118 can further include sensors to measure air speed or direction (e.g., anemometers, air speed loggers (ASL)), moisture content (e.g., tensiometric sensors, humidity sensors), or pressure, such as applied to a seat 455 by an occupant, (e.g., piezoresistive pressure sensors, bourdon tubes, or strain gauges).

The airflow device 120 can refer to or include a blower. The airflow device 120 can refer to or include a fan. The airflow device 120 can be any type of electromechanical fan for directing air. The airflow device 120 can be, for example, a centrifugal blower, a regenerative blower, a positive displacement blower, or another type of blower known to those in the art. The airflow device 120 can be coupled to a heating and cooling element 122, or can be standalone. The airflow device 120 can be located in a seat 455 of the vehicle and can provide airflow for the seat 455. The airflow device 120 can facilitate directional movement of heated or cooled air within the vehicle. For example, the airflow device 120 can provide airflow to move heated air from the heating and cooling element 122 to a surface of a seat 455. One or more blowers 120 can be located throughout the cabin of the vehicle. The airflow device 120 can include blades to move air. The airflow device 120 can include a motor with a variable speed or duty cycle. In some embodiments, the one or more blowers 120 can output a variable volume, temperature, or speed of air. In some embodiments, the one or more blowers 120 can be configured to direct air to different locations or subcomponents of the cabin.

The heating and cooling element 122 can be any electrical, mechanical, chemical, or combination thereof means for affecting the temperature of a component of the vehicle. The heating and cooling element 122 can include just a heating element, just a cooling element, or a combination thereof. The heating and cooling element 122 can include the airflow device 120, an electric heat pad, a heat pump, air conditioner, compressor, coolant or coolant-filled tubes, an evaporator, or other mechanisms by which to heat or cool. The heating and cooling elements of the heating and cooling element 122 can be located separately or separately controlled by controller 110. The heating and cooling element 122 can change the temperature of a component of the vehicle by directly heating or cooling the component, or by heating or cooling the airflow through the one or more blowers 120. For example, the heating and cooling element 122 can heat a seat 455 of the vehicle by applying direct heat (e.g., through a heat pad) or by heating the airflow through the airflow device 120 directed towards the seat.

The data processing system 102 can store, transmit, receive, or display information that can facilitate estimating or controlling the temperature of the surface of the seat of the vehicle. The data processing system 102 can communicate with internal subcomponents (described herein) or external components of the vehicle (e.g., sensor 118, airflow device 120, heating and cooling element 122). The data processing system 102 can, for example, store data about the system in data repository 112. The data processing system 102 can, for example, transmit information received by sensor 118 to the data collector 104. Transmittal by the data processing system can occur by a hardwired connection (e.g., copper wire or fiber optics) or via a wireless connection (e.g., Wifi, Bluetooth, controller area network (CAN), local area network (LAN)). The data processing system 102 can include a network of subcomponents (e.g., data collector 104, state detector 106, temperature estimator 108, controller 110, or data repository 112) which communicate with each other as described herein. The data processing system can be coupled with a memory, such as data repository 112. The data processing system can be physically located within the vehicle or can be accessed by an external computing device.

Figure 4:
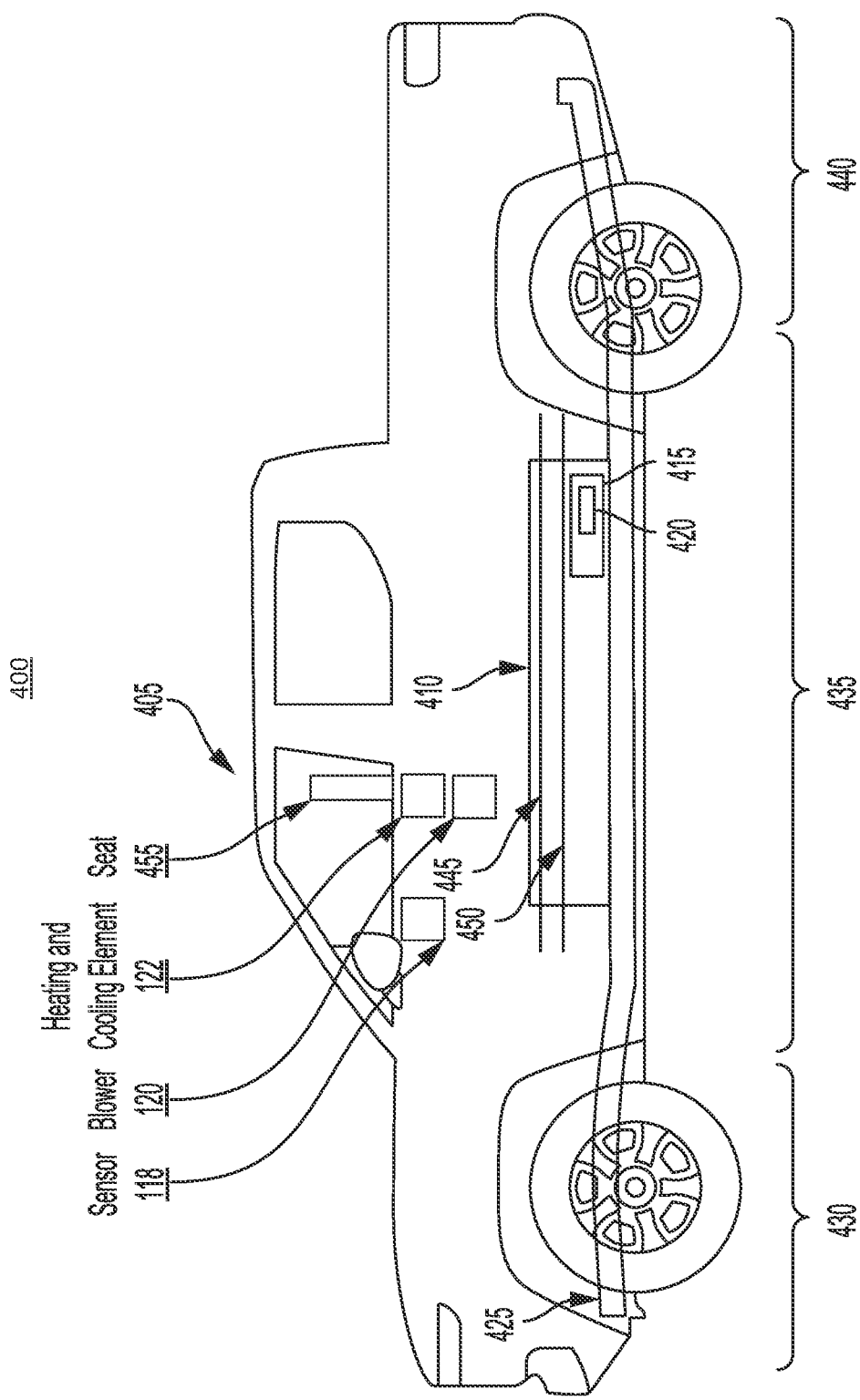
FIG. 4 depicts a cross sectional view of a vehicle.

In an illustrative example, the data processing system 102 can execute on one or more processors of a vehicle, such as vehicle 405 depicted in FIG. 4. The data collector 104 can receive information from one or more sensors 118 that indicate temperature or environmental conditions of or associated with the vehicle. The data collector 104 can receive information regarding a parameter of the airflow device 120, such as a speed of the airflow device 120. The state detector 106 can determine whether the seat of the vehicle is occupied by a driver or passenger. The temperature estimator 108 can process the information received by the data collector 104 and the state information determined by the state detector 106 to estimate, determine or otherwise identify a temperature of the surface of the seat of the vehicle. The controller 110 can generate and send a command to control the heating and cooling element 122 based on the estimated temperature of the surface of the seat. For example, the controller 110 can generate a command to cool the seat if the estimated temperature is greater than the desired temperature for the surface of the seat, or generate a command to heat the seat if the estimated temperature is less than the desired temperature for the surface of the seat.

The data processing system 102 can include a data collector 104 designed, constructed and operational to receive, identify, obtain, or otherwise access data that facilitates estimating a temperature or controlling a temperature. The data collector 104 can be any combination of hardware and software for collecting, storing, processing, identifying or receiving information or data of the vehicle. Information or data of the vehicle can include a temperature of the vehicle, light within the vehicle (e.g., solar radiation), moisture content of the air of the vehicle, or airflow directions of the vehicle. For example, the data collector 104 can accept inputs from one or more sensors 118. The sensors 118, described herein, can indicate a temperature of a component of the vehicle, such as a heating or cooling element 122, airflow, a surface of a seat 455, or a heating pad of a seat 455, to the data collector 104.

The data collector 104 can identify a parameter of an airflow device 120 of the vehicle. A parameter of the airflow device 120 can be, for example, a speed of the airflow device 120, such as rotational speed of blades of the airflow device 120 or speed of the airflow from the airflow device 120. The parameter can refer to or include a power consumption of the airflow device 120, or duty cycle of the airflow device 120. The data processing system 102 can determine the speed of the airflow or percentage speed or setting of the airflow device 120 based on the power level or duty cycle. For example, a duty cycle of 50% can correspond to a predetermined airflow speed. The data collector 104 can identify the speed (e.g., rotational of the blades or a motor, or of the laminar or turbulent airflow) of an airflow device 120 by the duty cycle of the airflow device 120, the power consumption of the airflow device 120, or a change in air pressure around the airflow device 120. The data processing system 102 can determine the approximate speed of the airflow based on the duty cycle, blower setting, or other data received by the data collector 104.

The data collector 104 can identify, from a second sensor of the one or more sensors 118, an amount of solar radiation. For example, the data collector 104 can identify or quantify solar radiation (e.g., the surface power density received by the sun) imposed upon a seat 455 of the vehicle. The solar radiation can be in units of kilowatt-hours per square meter.

The data collector 104 can receive temperature information from one or more sensors 118. The data collected by the data collector 104 can be associated with an identifier of the sensor or an indication of the location of the sensor. The data can be associated with a time stamp. The data collector 104 can receive the data as a data stream or real-time data feed. The data collector 104 can ping or poll the sensor 118, airflow device 120, or heating and cooling element 122 for the data. The data collector 104 can access and modify the data repository 112 to store or alter the various information collected.

The data processing system 102 can include a state detector 106 designed, constructed and operational to determine a state of the vehicle. For example, the state can refer to or include whether there is an occupant in the vehicle. The state can refer to or include whether there is an occupant of a seat in the vehicle. For example, the state detector 106 can determine whether a driver is sitting in the driver seat. The state detector 106 can determine whether a passenger is sitting in a passenger seat. The state detector 106 can receive data from a pressure sensor 118 or weight sensor 118 located on a seat in order to determine the state of occupancy of the seat. For example, if the detected pressure or weight is greater than a threshold, then the state detector 106 can determine that the seat is occupied. The state detector 106 can receive data from a proximity sensor in order to determine the state of occupancy of the seat. Thus, the state detector 106 can receive data or information from data collector 104 in order to determine a state of occupancy of one or more seat of the vehicle.

The state detector 106 can be any combination of hardware and software configured to detect a state corresponding to the occupation of a seat 455 of the vehicle. The state detector 106 can, in some embodiments, select a corresponding model from the one or more models 114, responsive to a detection of the state of occupancy of the seat 455. The state detector 106 includes one or more sensors 118 configured to detect a change in occupancy of the seat. As described in conjunction with sensors 118, the sensors 118 may detect a change in pressure of the seat. In some embodiments, the state detector 106 can, responsive to input from sensors 118 or from data collector 104, detect whether a seat 455 of the vehicle is occupied or vacant. Responsive to determining the state (e.g., occupied or vacant) of the seat 455, the state detector 106 can access the one or more models 114 stored in data repository 112 and can select or modify one or more corresponding models 114 for the state of the seat 455. For example, the state detector 106 can receive an input from a pressure sensor 118 and can detect from that input that the seat is occupied. Responsive to a detection that the seat is occupied, the state detector 106 can, in some embodiments, access the models 114 and can select, based on the occupied state, one or more models 114 which correspond to an occupied seat state. Likewise, in some embodiments, the state detector 106 can determine that the seat 455 is vacant, responsive to an indication from the one or more sensors 118. Responsive to the determination that a seat is vacant, the state detector 106 can choose one or more corresponding models of the models 114 stored in data repository 112. In some embodiments, responsive to a seat 455 state detection, the state detector 106 can modify a model 114. For example, the state detector 106 could modify a model 114 mathematically to indicate an occupied or vacant seat 455. The state detector 106 can communicate the one or more selected models (also referred to as the subset of models) to the temperature estimator 108, the controller 110, or other components of the data processing system 102.

The data processing system 102 can include a temperature estimator 108 designed, constructed and operational to estimate a temperature. The temperature estimator 108 can estimate the temperature of any component or portion of the vehicle for which a sensor 118 is not capable or configured to provide a temperature measurement. For example, the temperature estimator 108 can estimate the temperature of a surface of the seat in the cabin. In another example, the temperature estimator 108 can use the model configured to estimate the temperature of a bench of the vehicle, a table of the vehicle, a seat external to the cabin of the vehicle, or a bed of the vehicle. The temperature estimator 108 can estimate the temperature of the surface of the seat without getting a measurement of the temperature on the surface of the seat. The temperature estimator 108 can estimate the average temperature of the surface of the seat, as opposed to estimating the temperature at a particular point or location on the seat. The temperature estimator 108 can take into account various factors and data collected by the data collector 104 in order to estimate the average temperature of the surface of a seat in the vehicle.

The temperature estimator 108 can be any combination of hardware and software configured to determine the temperature of a component of the vehicle. A component of the vehicle can include at least the ambient air of the vehicle or its cabin, a surface of a seat 455 of the vehicle, a heating pad of a seat 455 of the vehicle, the steering wheel of the vehicle, or the dashboard of the vehicle. Determining the temperature of the surface of the seat 455 can be responsive to at least one model 114 or a subset of models 114 described herein.

The temperature estimator 108 can receive inputs from the data collector 104 and the state detector 106 to determine which model of the one or more models 114 corresponds to the current temperature information and speed of the airflow device 120. Based at least upon the temperature information and speed (e.g., airflow speed, rotational speed) of the airflow device 120, the temperature estimator 108 can estimate a temperature of the seat 455 by selection of a model 114 which corresponds to the current temperature information and speed. Current temperature information (as described herein) and speed can be provided by at least the data collector 104, the data repository 112, or the state detector 106. In some embodiments, the actual temperature of a vehicle component can differ from a measured temperature. For example, the temperature estimator 108 can analyze a measured temperature (from the data collector 104) of the surface of the seat 455 and the speed of the airflow from the airflow device 120 and make a determination of an estimation of the actual temperature of the surface of the seat 455.

Temperature information, as described herein, can include at least a temperature of the ambient air, a temperature of the cabin, a temperature of a seat 455, a temperature of the airflow at an inlet, a temperature of the airflow output by a heater of the vehicle, temperature of a heating and cooling element 122, temperature of airflow output by a heater of the vehicle, temperature of the airflow output by an airflow device 120 of the vehicle, a temperature of a steering wheel, a temperature of a component of the vehicle not listed herein, or a weight average of the temperatures of any component of the vehicle. For example, receiving temperature information can refer to receiving a weighted average of the one or more temperature sensors of a heat pad of a seat, of receiving temperature information can refer to receiving a temperature of the ambient air. The data processing system 102 can receive the temperature information from one or more sensors 118.

The temperature estimator 108 can take in further inputs to aid in the determination of estimated temperature. For example, the temperature estimator 108 can estimate a temperature of the vehicle based upon the temperature information, the speed of the airflow device 120, and the amount of solar radiation. The amount of solar radiation can be catalogued by data collector 104 and relayed to the temperature estimator 108 in order to select a corresponding model 114 for a given set of conditions (e.g., a specific temperature of the vehicle and speed of the airflow device 120). In some embodiments, the temperature estimator 108 can determine, via the model 114 based on the temperature information, the speed of the blower, and the amount of solar radiation, the temperature of the surface of the seat 455. In some embodiments, the temperature estimator can determine, via the model 114, the temperature of the surface of the seat based at least in part on a weight average of the seat temperature, the cabin temperature, and the temperature of airflow output by the heater of the vehicle.

The models 114 can be one or more data structures stored in data repository 112 which corresponds to one or more of temperature information, airflow device 120 speed, state of occupancy of the seat 455, solar radiation, or estimated temperature. The models 114 can include a function for the seat 455 surface temperature estimated based at least upon empirical data preset in the data structure of the model 114. The models 114 can be accessed by any of the components of the data processing system 102. For example, the temperature estimator 108 can access the models 114 to compare specific data received from data collector 104 to make a determination of an estimated temperature of a seat 455 of the vehicle. The models 114 can include in their data structures estimated temperatures which correspond to the given set of conditions described herein. The models 114 can include coefficients which are configured based on a state of occupancy of the seat. For example, responsive to an indication of an occupied seat by the state detector 106, the subset of models may be restricted by a coefficient, or the models 114 may be mathematically adjusted based on the state of occupancy of a seat 455. The models 114 can be edited by an external computing system, such as to add further models, delete existing models, or add other data considerations (e.g., beyond specific temperature information, airflow device 120 speed, state of occupancy of the seat 455, solar radiation, or estimated temperature) for the models 114 to operate upon. For example, the temperature estimator 108 may take in further inputs to determine the estimated temperature by the models 114.

The data processing system 102 can use a model 114 that is a physics-based model 114. The physics-based model can include a function with variable and coefficients. For example, the physics-based model 114 can include a weighted average of various parameters. For example, the model 114 can include or be based on Function 1 as follows:

$$T_{seat,avg} = C_6 + \frac{\left(C_1 + C_2 B_L^{C_3}\right) T_{seat} + C_4 T_{cab} + C_5 T_{PTC}}{C_1 + C_2 B_L^{C_3} + C_4 T_{cab} + C_5 T_{PTC}}$$

Function 1: Illustrative Example of Physics-Based Model to Estimate Temperature of a Surface of a Seat of a Vehicle.

As used in function 1, $T_{seat,avg}$ can refer to the average temperature of the surface of the seat; BL can be the speed of the airflow device 120 (e.g., in percentage of blower speed); $T_{seat}$ can be the temperature of the heating pad in the seat as measured by a temperature sensor 118; $T_{cab}$ can be the temperature of the cabin of the vehicle as measured by a sensor 118 located in the cabin of the vehicle (e.g., below the steering wheel); $T_{PTC}$ can be the temperature of the onboard heater, such as the air temperature coming out of a vent in the cabin of the vehicle; $C_1$ can be a coefficient for a conduction resistance; $C_2$ can be a coefficient for convection heat transfer; $C_3$ can be a coefficient for a flow pattern based on velocity of the air speed; $C_4$ can be a coefficient for a heat transfer that can be based on the size of the cabin and where the cabin temperature sensor is located; $C_5$ can be another coefficient for a heat transfer that can be based on the size of the cabin and where the cabin temperature sensor is located; $C_6$ can be a coefficient that provides an offset or used to calibrate the function.

The coefficients C1-C6 can be configured, calibrated or otherwise tuned for a particular type of vehicle, type of seat, geographic location of the vehicle, weather condition, environmental condition, speed of vehicle, solar radiation detected in the cabin, or state of occupancy of the seat. In some cases, the data processing system 102 multiple models 114, where each model 114 can be configured, calibrated or otherwise tuned for a set of conditions. For example, a first model 114 can include coefficients C1-C6 that are calibrated or tuned for when the seat is occupied (e.g., when the driver is sitting in the seat). A second model 114 can include different values of one or more of coefficients C1-C6 that are calibrated or tuned for when the seat is vacant (e.g., when the driver is not sitting in the seat or is otherwise not in the cabin). A third model 114 can include different values of one or more of coefficients C1-C6 that are calibrated or tuned for when a window of the car is open, if the vehicle is in a cold climate, the material of the seat, or other condition or factor.

The temperature estimator 108 can input data received from the data collector 104 into the model 114 (e.g., Function 1). The model 114 can be configured with the coefficients. The model 114 can be preconfigured with the coefficients, have default coefficient values, or the coefficients can be tuned or calibrated for the vehicle. The temperature estimator 108 can output the value of T_seat,avg determined using the model 114 to the controller 110 for further processing.

The data processing system 102 can include a controller 110 designed, constructed and operational to manage, control, modify, or otherwise influence the temperature of the surface of the seat. The controller 110 can be any combination of hardware and software to make a comparison between the estimated temperature (from the temperature estimator 108) and the setpoint 116 and to control a temperature of the airflow of the vehicle responsive to the comparison. The controller 110 can actuate, initiate, or control the airflow device 120, the heating and cooling element 122, or other components of the system 100. In some embodiments, the controller 110 can change a parameter of the airflow device 120 to change a temperature of the airflow provided via the airflow device 120. The controller 110 can change a temperature of the airflow provided via the airflow device 120 for the seat 455 based on the temperature of the surface of the seat 455. For example, responsive to receiving an estimated temperature from the temperature estimator 108, the controller 110 can compare the estimated temperature with the setpoint 116 temperature and can change a parameter of the airflow device 120 to close any gap between the estimated and setpoint 116 temperatures. For example, if the setpoint 116 temperature of the seat is cooler than the estimated temperature of the seat 455, the controller 110 may actuate the airflow device 120 to provide cooler air to the seat 455. For example, if the setpoint 116 temperature of the seat 455 is warmer than the estimated temperature of the seat 455, the controller 110 may actuate the heating and cooling element 122 to heat the seat 455 directly, or to heat airflow directed towards the seat 455. The controller 110 can control the airflow device 120 and the heating and cooling element 122 individually or simultaneously.

Thus, by using the model 114 to estimate the average temperature of the surface of the seat, the data processing system 102 can more efficiently control the heating and cooling element 122 to accurately maintain a desired temperature setpoint 116 for the vehicle. The data processing system 102, using the model 114, can reduce the amount of overshoot over the setpoint 116 by 10 to 15 degrees Celsius, for example, thereby reducing energy consumption or battery utilization by not unnecessarily heating or cooling the seat.

Figure 2:
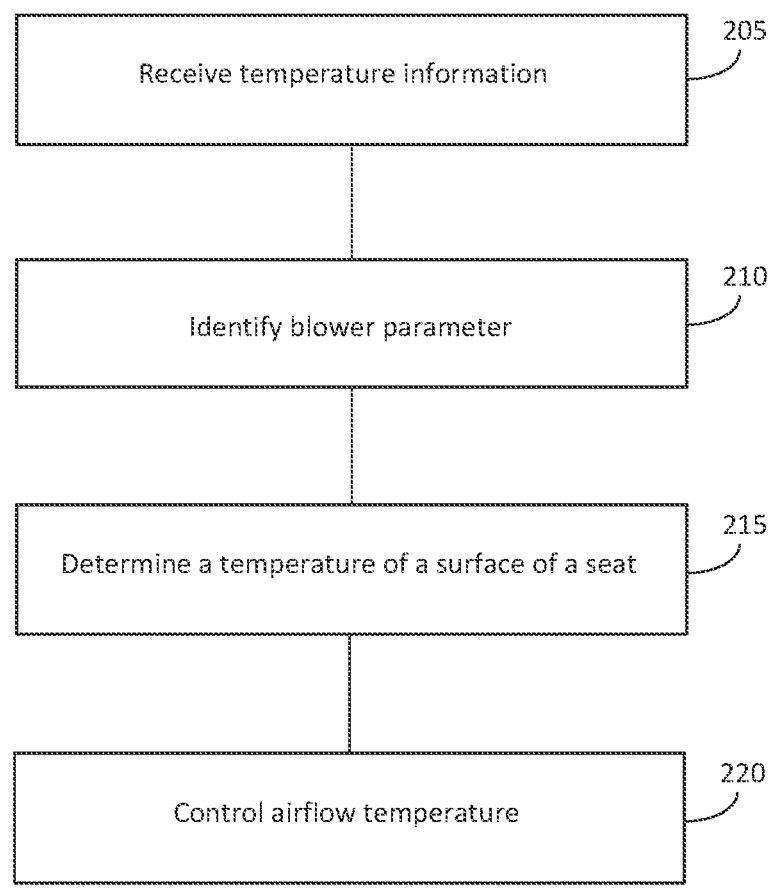
FIG. 2 depicts an example method of controlling the temperature of a surface of a seat in a vehicle.

FIG. 2 depicts an example method 200 of controlling the temperature of a surface of a seat of a vehicle. The method 200 can be performed by one or more systems or components depicted in FIG. 1, FIG. 4, or FIG. 5, including, for example, a data processing system. At ACT 205, the method 200 can include the data processing system receiving temperature information. The data processing system can receive temperature information via the data collector 104, state detector 106, temperature estimator 108, heating and cooling element 122, controller 110, or sensors 118. The data processing system can receive temperature information from a first sensor of the sensors 118. The data processing system can receive temperature information from one or more sensors 118. The one or more sensors 118 can include at least one of a heating pad sensor located at a heating pad of the seat 455, an ambient cabin temperature sensor, or an evaporator temperature sensor. The one or more sensors can include a sensor to measure an amount of solar radiation. The data processing system can identify, from a second sensor of the sensors 118, an amount of solar radiation.

The data processing system can receive temperature information in real-time, via a data stream, periodically (e.g., every 1 second, 2 seconds, 3 seconds, 5 seconds, 10 seconds, 15 seconds, 20 seconds, 30 seconds, 60 seconds, or other time interval). The data processing system request temperature information from one or more component or sensor of the vehicle, such as via a poll, query, ping, or fetch operation. The data processing system can request temperature information or other data responsive to a condition or event, such as detecting a change in state of occupancy of a seat of the vehicle, the opening or closing of the door, opening or closing of a window of the vehicle, or an instruction from a driver or user of the vehicle.

At ACT 210, the data processing system can identify a parameter of an airflow device of the vehicle, such as a speed of a blower. The one or more blowers 120 can include one or more parameters. In some embodiments, the one or more parameters of the airflow device 120 can include a speed of the blower such as a rotational speed of the blower as a percentage (e.g., 0%, 25%, 50%, 75%, or 100%), as a level (e.g., high, medium, low, or off), a speed of airflow of the blower, a volume of airflow, duty cycle, or a temperature of airflow. A parameter of a blower can provide airflow for a seat of the vehicle. The data processing system can identify a parameter of the blower by analyzing inputs from sensors 118, such as temperature or airflow sensors as described herein. The data processing system can determine the speed of the blower based on a duty cycle of the blower.

At ACT 215, the data processing system can determine a temperature of a surface of a seat. The data processing system can use a model (e.g., models 114) to determine or estimate a temperature of a surface of the seat 455 based on the temperature information and a parameter of the blower. The data processing system can make the determination based on a comparison of the temperature information and the speed of the blower to temperature information and speeds of blowers contained within the data structure of the models 114. For example, the identified blower speed and temperature information can correspond to one or more models. The corresponding model can indicate, within its data structure, a corresponding estimated seat temperature. The data processing system can determine, via the model 114, the temperature of the surface of the seat using additional parameters or variables, such as the temperature information, the speed of the blower, and the amount of solar radiation. The data processing system can, in some cases, utilize a models that receives as input a value of solar radiation.

Thus, the data processing system can select a model from a set of models stored in a data repository that is configured for the vehicle based on a state of the seat. A state of the seat can include occupied or vacant. In some embodiments, the one or more processors, in conjunction with the sensors 118, can determine if a seat is occupied or vacant (e.g., the state of the seat). In some embodiments, the models can include coefficients configured based on a state of occupancy of the seat. For example, the model can be adjusted based on the state of occupancy of the seat to account for changes in temperature of the surface of the seat from the occupant or lack thereof. The coefficients can be pre-configured to correspond to a state of occupancy of the seat and can be applied automatically to the model based upon the detected state of occupancy.

The data processing system can determine, via the model, the temperature of the surface of the seat based at least in part on a weight average of the seat temperature, the cabin temperature, and the temperature of airflow output by the heater of the vehicle. The model can include the temperature of the surface of the seat based at least in part on a weight average of the aforementioned and can calculate or match a corresponding estimated surface seat temperature.

At ACT 220, the data processing system can control the airflow temperature. The data processing system can control a temperature of the airflow provided via the blower (e.g., airflow device 120) for the seat 455 based on the temperature of the surface of the seat. For example, responsive to the determined temperature of the surface of the seat exceeding or being under a setpoint 116, the controller can initiate a command to the heating and cooling element 122 to change the temperature of the airflow provided to the seat via the blower. The data processing system can heat the surface of the seat if the estimated surface temperature is below the setpoint, or cool the seat if the estimated surface of the seat is greater than the setpoint.

The data processing system can continue monitor or estimate the surface of the seat in order to determine whether to increase or decrease the amount of heating or cooling based on a current estimated temperature of the surface of the seat. In some cases, the data processing system can utilize a proportional, integral, derivative ("PID") controller to gradually adjust the temperature of the seat to satisfy the setpoint. The feedback into the PID controller can include the estimated average surface temperature of the seat as determined using a model or function.

Figure 3:
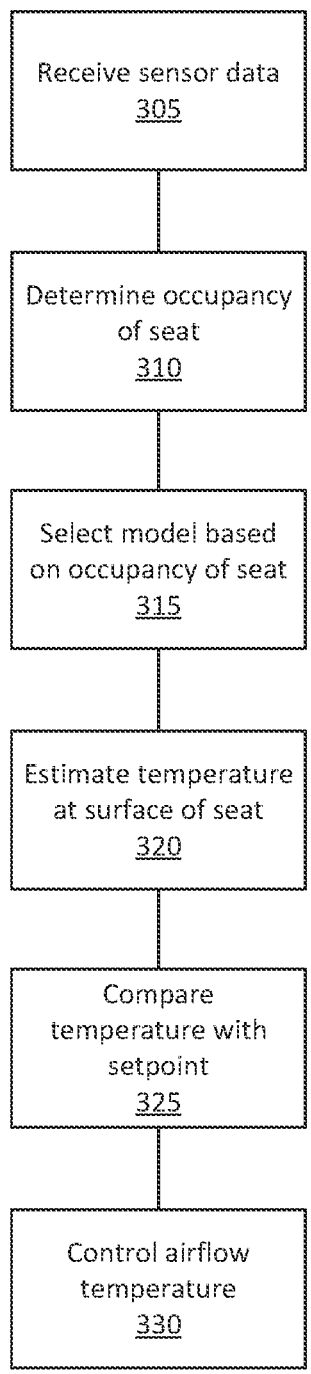
FIG. 3 depicts an example method of controlling the temperature of a surface of a seat in a vehicle.
Figure 5:
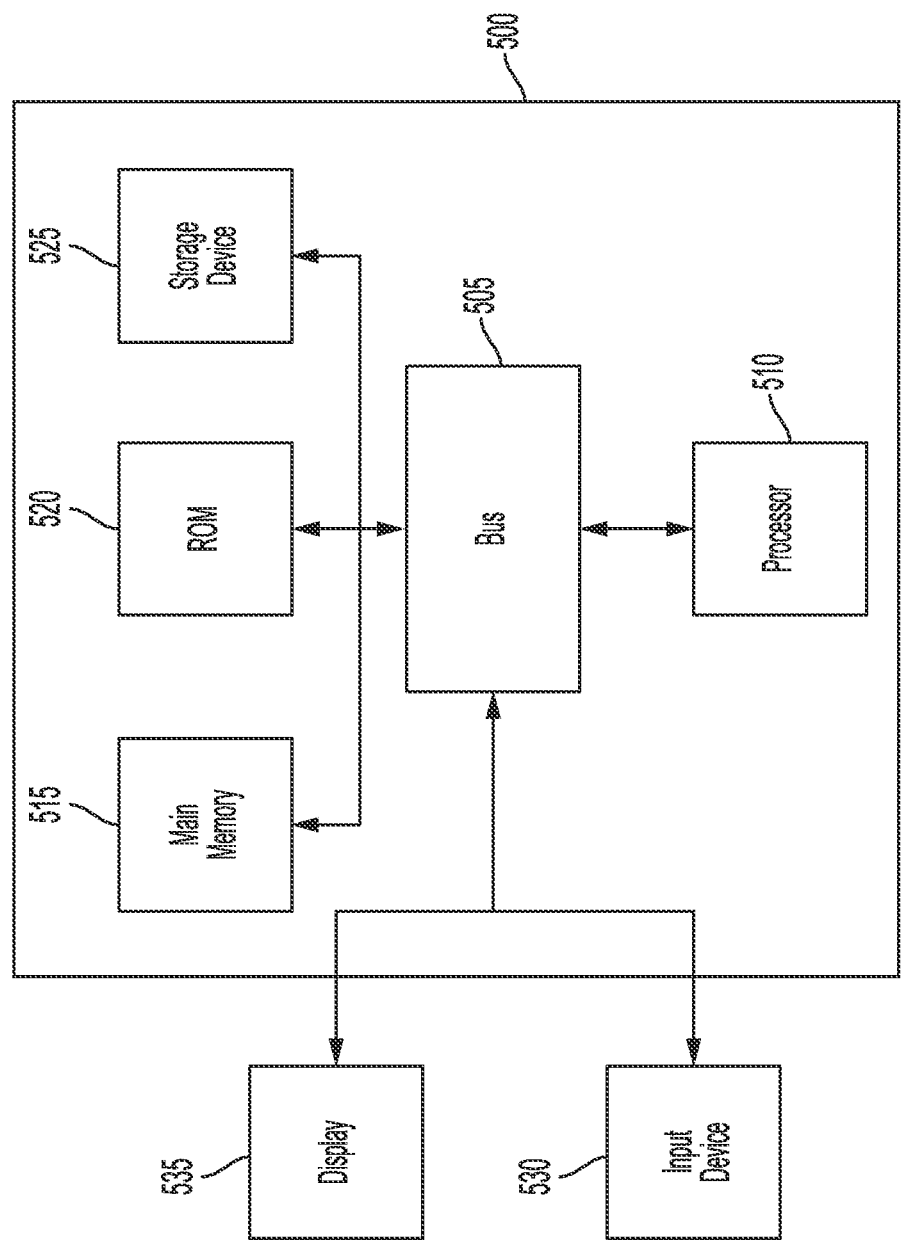
FIG. 5 is a block diagram illustrating an architecture for a computer system that can be employed to implement elements of the systems and methods described and illustrated herein, including, for example, the system depicted in FIG. 1 and the methods depicted in FIGS. 2-3.

FIG. 3 depicts an example method of controlling the temperature of a surface of a seat in a vehicle. The method 300 can be performed by one or more systems or components depicted in FIG. 1. FIG. 4, or FIG. 5, including, for example, a data processing system. At ACT 305, the data processing system can receive sensor data. Sensor data can be received, for example, by the data collector 104. Data collector 104 can receive data sent from one or more sensors 118. Data received by data collector 104 can include data related to pressure, solar radiation, temperature, moisture content, airflow speed or direction, or another measurable quality of any component of the system. Sensor data can indicate, for example, a temperature of a heating pad of a seat 455 of the vehicle. In some embodiments, one or more sensors 118 located in a heating pad of a seat (e.g., seat 455) of a vehicle can provide temperature data to the data collector 104. Temperature data (also referred to herein as temperature information) can include at least individual temperatures at a sensor location, a range of temperatures, or a weight average of temperatures.

Sensor data can include data which indicates whether a seat 455 is occupied or vacant. For example, data from a pressure sensor in a seat 455 may be communicated to the data collector 104 or the state detector 106. For example, a sensor in a seat 455 of the vehicle can indicate if a weight applied to the seat is above or below a certain threshold of weight, such as the minimum weight on an adult human.

At ACT 310, the data processing system can determine the state of occupancy. The occupancy of the seat can be determined responsive to ACT 305, in which sensor data is received. Sensor data relating to the occupancy of the seat 455 can be transmitted to the data collector 104 and thereby to the state detector 106, or directly to the state detector 106.

The data processing system can determine, from sensor data, whether a seat 455 is occupied or vacant. For example, the data processing system can compare pressure data to a threshold pressure amount to determine if the pressure applied to the seat 455 exceeds the threshold, thereby indicating a human occupant of the seat. However, the data processing system can determine that a lack of pressure exerted on the seat (e.g., the measured pressure information being below a pressure threshold) indicates the seat 455 is vacant. The data processing system can use an IR sensor to determine whether a seat 455 is occupied or vacant. The data processing system can use data from a sensor located within a seatbelt receiver to determine whether a seat is occupied. Thus, the data processing system can use one or more sensors or a combination thereof to determine whether a seat 455 is occupied or vacant. The state detector 106 can, in some cases, perform logical operations to determine if the seat 455 is occupied or vacant, responsive input from one or more sensors 118 or the data collector 104.

At ACT 315, the data processing system can select a model based at least upon the occupancy of the seat 455. For example, responsive to a detection of an occupant in the seat 455 by the state detector 106, the data processing system can alter or select a subset of models for use by the temperature estimator 108. The selection of a model 114 can refer to or include applying a mathematical constraint, coefficient, limitation, weight, multiplier, or operation to the one or more models 114. For example, selection of a model 114 can refer to applying a coefficient to a function of a model responsive to a determination that a seat is occupied. For example, selection of a model 114 can refer to dividing results of the model by a predetermined number encoded in the model, responsive to an indication that a seat is vacant. Selection of a model 114 can refer to creating a subset of models 114. For example, responsive to a determination of the occupancy of the seat 455, a subset of models 114 can be created from the one or more models 114.

At ACT 320, the data processing system can estimate the temperature at the surface of a seat. A temperature of a surface of a seat 455 can be estimated by the temperature estimator 108. Temperature estimator 108 can estimate the temperature at the seat 455 responsive to one or more inputs such as temperature information from the data collector 104, solar radiation information, state of occupancy of the seat 455, and the selected model 114. In some embodiments, temperature estimator 108 can apply coefficients or other operations to the model 114 to estimate the temperature of the surface of the seat. In some embodiments, the estimated temperature is calculated by the selected model 114 in response to at least the temperature information as an input by the temperature estimator 108.

At ACT 325, the data processing system can compare the estimated temperature with a setpoint or target or desired temperature. The estimated temperature can be determined by a temperature estimator using a model or function, for example. The data processing system can compare the estimated temperature with the setpoint. For example, the data processing system can evaluate any discrepancy between the setpoint and the estimated temperature for adherence to a temperature tolerance. A temperature tolerance can be a threshold, limit, or amount of allowable difference between the estimated temperature and the setpoint. If the estimated temperature deviates from the target temperature by more than a predefined amount, then the data processing system can determine to activate a heater or cooler (or increase the amount of heating or cooling) to reach the target temperature.

At ACT 330, the data processing system can facilitate controlling the temperature of the airflow provided to the seat or within the cabin, or both. Control of airflow temperature can refer to an action, actuation, or initiation by the controller 110 to any of the airflow device 120, the heating and cooling element 122, or another component of the system 100. The data processing system can control airflow temperature responsive to at least a comparison of the estimated temperature with a setpoint. For example, upon a determination that the discrepancy between the estimated temperature and setpoint is outside of the temperature tolerance, the controller 110 may initiate an action is the airflow device 120 or the heating and cooling element 122. For example, if the estimated temperature is cooler than the setpoint (outside of the temperature tolerance) the controller may activate the heating and cooling element 122 to heat the airflow of the airflow device 120. For example, if the estimated temperature is hotter than the setpoint (outside of the temperature tolerance), the controller may initiate the heating and cooling element 122 to cool the airflow of the airflow device 120 directed to the surface of the seat 455. For example, if the estimated temperature and the setpoint are within the temperature tolerance, the controller 110 may indicate to the airflow device 120 and the heating and cooling element 122 to not operate, or to continue current operation.

FIG. 4 depicts an example cross-sectional view 400 of an electric vehicle 405 installed with at least one battery pack 410. Electric vehicles 405 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 410 can also be used as an energy storage system to power a building, such as a residential home or commercial building. Electric vehicles 405 can be fully electric or partially electric (e.g., plug-in hybrid) and further, electric vehicles 405 can be fully autonomous, partially autonomous, or unmanned. Electric vehicles 405 can also be human operated or non-autonomous. Electric vehicles 405 such as electric trucks or automobiles can include on-board battery packs 410, batteries 415 or battery modules 415, or battery cells 420 to power the electric vehicles. The vehicle 405 can include sensors 118, airflow device 120, and heating and cooling element 122. The electric vehicle 405 can include a chassis 425 (e.g., a frame, internal frame, or support structure). The chassis 425 can support various components of the electric vehicle 405. The chassis 425 can span a front portion 430 (e.g., a hood or bonnet portion), a body portion 435, and a rear portion 440 (e.g., a trunk, payload, or boot portion) of the electric vehicle 405. The battery pack 410 can be installed or placed within the electric vehicle 405. For example, the battery pack 410 can be installed on the chassis 425 of the electric vehicle 405 within one or more of the front portion 430, the body portion 435, or the rear portion 440. The body portion of the vehicle 405 can include a cabin in which occupants or passengers sit. Passengers of the cabin can sit in a seat 455 of the cabin. Seat 455 can be configured to include heating and cooling element 122 or airflow device 120. Seat 455 can be configured to be heated or cooled to an occupant's desired temperature. The battery pack 410 can include or connect with at least one busbar, e.g., a current collector element. For example, the first busbar 445 and the second busbar 450 can include electrically conductive material to connect or otherwise electrically couple the battery 415, the battery modules 415, or the battery cells 420 with other electrical components of the electric vehicle 405 to provide electrical power to various systems or components of the electric vehicle 405.

For example, the battery cell 420 can include at least one lithium-ion battery cell. In lithium-ion battery cells, lithium ions can transfer between a positive electrode and a negative electrode during charging and discharging of the battery cell. For example, the battery cell anode can include lithium or graphite, and the battery cell cathode can include a lithium-based oxide material. The electrolyte material can be disposed in the battery cell 420 to separate the anode and cathode from each other and to facilitate transfer of lithium ions between the anode and cathode. Battery cell 420 can also take the form of a solid state battery cell developed using solid electrodes and solid electrolytes.

FIG. 5 depicts an example block diagram of an example computer system 500. The computer system or computing device 500 can include or be used to implement a data processing system or its components. The computing system 500 includes at least one bus 505 or other communication component for communicating information and at least one processor 510 or processing circuit coupled to the bus 505 for processing information. The computing system 500 can also include one or more processors 510 or processing circuits coupled to the bus for processing information. The computing system 500 also includes at least one main memory 515, such as a random access memory (RAM) or other dynamic storage device, coupled to the bus 505 for storing information, and instructions to be executed by the processor 510. The main memory 515 can be used for storing information during execution of instructions by the processor 510. The computing system 500 may further include at least one read only memory (ROM) 520 or other static storage device coupled to the bus 505 for storing static information and instructions for the processor 510. A storage device 525, such as a solid state device, magnetic disk or optical disk, can be coupled to the bus 505 to persistently store information and instructions.

The computing system 500 may be coupled via the bus 505 to a display 535, such as a liquid crystal display, or active matrix display, for displaying information to a user such as a driver of the electric vehicle 405 or other end user. An input device 530, such as a keyboard or voice interface may be coupled to the bus 505 for communicating information and commands to the processor 510. The input device 530 can include a touch screen display 535. The input device 530 can also include a cursor control, such as a mouse, a trackball, or cursor direction keys, for communicating direction information and command selections to the processor 510 and for controlling cursor movement on the display 535.

The processes, systems and methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. Hard-wired circuitry can be used in place of or in combination with software instructions together with the systems and methods described herein. Systems and methods described herein are not limited to any specific combination of hardware circuitry and software.

Although an example computing system has been described in FIG. 5, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
one or more processors, coupled with memory, configured to:
receive, from a first sensor in a vehicle, temperature information;
identify a parameter of an airflow device that provides airflow for a seat of the vehicle;
determine, via a model based on the temperature information and the parameter of the airflow device, a temperature of a surface of the seat; and
control a temperature of the airflow provided via the airflow device for the seat based on the temperature of the surface of the seat.

2. The system of claim 1, wherein the one or more processors are configured to:
identify, from a second sensor in a cabin, an amount of solar radiation; and
determine, via the model based on the temperature information, a speed of the airflow device, and the amount of solar radiation, the temperature of the surface of the seat.

3. The system of claim 1, wherein the one or more processors are configured to:
identify, from the first sensor, the temperature information comprising a temperature of the airflow at an inlet.

4. The system of claim 1, wherein the first sensor includes at least one of a heating pad sensor located at a heating pad of the seat, an ambient cabin temperature sensor, or an evaporator temperature sensor.

5. The system of claim 1, wherein the airflow device comprises a blower, and wherein the one or more processors are configured to:
determine a speed of the blower based on a duty cycle of the blower.

6. The system of claim 1, wherein the one or more processors are configured to:
select the model from a plurality of models configured for the vehicle based on a state of the seat.

7. The system of claim 1, wherein the one or more processors are configured to:
detect that the seat is occupied; and
select the model from a plurality of models responsive to detection that the seat is occupied.

8. The system of claim 1, wherein the one or more processors are configured to:
detect that the seat is vacant; and
select the model from a plurality of models responsive to detection that the seat is vacant.

9. The system of claim 1, wherein the temperature information comprises a seat temperature, a cabin temperature, and a temperature of airflow output by a heater of the vehicle, and wherein the one or more processors are configured to:
select the model comprising coefficients configured based on a state of occupancy of the seat.

10. The system of claim 1, wherein the temperature information comprises a seat temperature, a cabin temperature, a temperature of airflow output by a heater of the vehicle, and wherein the one or more processors are configured to:
determine, via the model, the temperature of the surface of the seat based at least in part on a weight average of the seat temperature, the cabin temperature, and the temperature of airflow output by the heater of the vehicle.

11. A method, comprising:
receiving, by one or more processors coupled with memory, from a first sensor in a vehicle, temperature information;
identifying, by the one or more processors, a parameter of a device that provides airflow for a seat of the vehicle;
determining, by the one or more processors via a model, a temperature of a surface of the seat based on the temperature information and the parameter of the device; and
controlling, by the one or more processors, a temperature of the airflow provided via the device for the seat based on the temperature of the surface of the seat.

12. The method of claim 11, comprising:
identifying, by the one or more processors from a second sensor in a cabin, an amount of solar radiation; and
determining, by the one or more processors via the model, the temperature of the surface of the seat based on the temperature information, a speed of the device, and the amount of solar radiation.

13. The method of claim 11, comprising:
identifying, by the one or more processors, the temperature information comprising a temperature of the airflow at an inlet.

14. The method of claim 11, wherein the first sensor comprises at least one of a heating pad sensor located at a heating pad of the seat, an ambient cabin temperature sensor, or an evaporator temperature sensor.

15. The method of claim 11, wherein the device comprises a blower, the method comprising:
   determining, by the one or more processors, a speed of the blower based on a duty cycle of the blower.

16. The method of claim 11, comprising:
   selecting, by the one or more processors, the model from a plurality of models configured for the vehicle based on a state of the seat.

17. The method of claim 11, wherein the temperature information comprises a seat temperature, a cabin temperature, and a temperature of airflow output by a heater of the vehicle, and comprising:
   selecting, by the one or more processors, the model comprising coefficients configured based on a state of occupancy of the seat.

18. The method of claim 11, wherein the temperature information comprises a seat temperature, a cabin temperature, a temperature of airflow output by a heater of the vehicle, and comprising:
   determining, by the one or more processors via the model, the temperature of the surface of the seat based at least in part on a weight average of the seat temperature, the cabin temperature, and the temperature of airflow output by the heater of the vehicle.

19. A vehicle, comprising:
   one or more processors, coupled with memory, configured to:
      receive, from a first sensor in the vehicle, temperature information;
      identify a parameter of a blower that provides airflow for a seat of the vehicle;
      determine, via a model based on the temperature information and the parameter of the blower, a temperature of a surface of the seat; and
      control a temperature of the airflow provided via the blower for the seat based on the temperature of the surface of the seat.

20. The vehicle of claim 19, wherein the one or more processors are configured to:
   identify, from a second sensor in a cabin of the vehicle, an amount of solar radiation; and
   determine, via the model based on the temperature information, a speed of the blower, and the amount of solar radiation, the temperature of the surface of the seat.

* * * * *